United States Patent [19]

Shibato et al.

[11] Patent Number: 4,879,337

[45] Date of Patent: Nov. 7, 1989

[54] POLYOL RESIN COATING COMPOSITION CONTAINING NON-AQUEOUS POLYMER DISPERSION AND ALIPHATIC SULFONIC ACID COMPOUND

[75] Inventors: Kishio Shibato, Kamakura; Masataka Kawamura, Fujisawa, both of Japan

[73] Assignee: Nippon Oil and Fats Co., Ltd., Tokyo, Japan

[21] Appl. No.: 115,868

[22] Filed: Nov. 2, 1987

[30] Foreign Application Priority Data

Nov. 11, 1986 [JP] Japan .................................. 61-266650
May 14, 1987 [JP] Japan .................................. 62-117797
Sep. 1, 1987 [JP] Japan .................................. 62-216285

[51] Int. Cl.$^4$ ..................... C08F 265/04; C08L 51/08; C08L 61/28
[52] U.S. Cl. .................................. 524/504; 524/507; 524/512; 525/65; 525/66; 525/108; 525/110; 525/125; 525/127; 525/155; 525/161; 525/162
[58] Field of Search .................. 525/162, 65, 66, 108, 525/110, 125, 155, 127, 161; 524/504, 507, 512

[56] References Cited

U.S. PATENT DOCUMENTS

| | | | |
|---|---|---|---|
| 4,291,137 | 9/1981 | Nakate et al. | 525/162 |
| 4,340,511 | 7/1982 | Backhouse et al. | 524/504 |
| 4,413,084 | 11/1983 | Horvath | 524/315 |
| 4,525,499 | 6/1985 | Hayashi et al. | 523/523 |
| 4,611,028 | 9/1986 | Peng et al. | 524/850 |

FOREIGN PATENT DOCUMENTS 0075284 6/1975 Japan .

Primary Examiner—Theodore E. Pertilla
Attorney, Agent, or Firm—Arnold, White & Durkee

[57] ABSTRACT

A higher solid coating composition comprises a solid resin mixture of polyol resin and alkyletherified melamine resin, 0.2~10 parts by weight of an aliphatic sulfonic acid compound and 1~100 parts by weight of a non-aqueous polymer dispersion based on 100 parts by weight of the resin mixture. The non-aqueous polymer dispersion consists of (a) organic solvent component, (b) particle component insoluble in the component (a), and (c) particular dispersion stabilizer component soluble in the component (a) and capable of stably dispersing the component (b) into the component (a).

4 Claims, No Drawings

POLYOL RESIN COATING COMPOSITION CONTAINING NON-AQUEOUS POLYMER DISPERSION AND ALIPHATIC SULFONIC ACID COMPOUND

BACKGROUND OF THE INVENTION

1. Field of the Invention

This invention relates to a low pollution type coating composition having improved solubility in an organic solvent and resistance to color change of resulting coated film and using an acid catalyst and a non-aqueous polymer dispersion having excellent dispersion stability and compatibility with a coating resin.

2. Related Art Statement

Recently, needs for higher solid coating compositions are raised for reducing a volatile organic compounds and improving a quality of coated film appearance. In general, it is known to use low viscosity and high solid materials, that is, a low molecular weight base resin, a curing agent and a non-aqueous polymer dispersion for increasing the solid content of the coating. Among these materials, the non-aqueous polymer dispersion itself is low in the viscosity and high in the solid content and has a function for controlling fluidity of the coating such as prevention of sagging in vertical direction, uniform orientation of metallic or inorganic flat pigment or the like, so that it is particularly regarded as important for developing the higher solid coating. In this case, the function for controlling the fluidity of the coating is effective as the particle size of the non-aqueous polymer dispersion becomes smaller.

In the conventionally practised non-aqueous polymer dispersion, a so-called graft copolymer or a high molecular weight melamine resin having a long side chain of low polarity is frequently used as a dispersion stabilizer in order to stably disperse particles into an organic solvent.

The mechanism of stabilizing particles through such a dispersion stabilizer is considered due to the fact that a part of the molecular structure of the dispersion stabilizer is fixed to the surface of the particle and the remaining portion thereof is solvated by the organic solvent to prevent agglomeration between the particles.

Therefore, the non-aqueous polymer dispersion must be prepared so that the particle is insoluble in the organic solvent but the dispersion stabilizer is soluble therein.

That is, the non-aqueous polymer dispersion is composed by properly balancing polarity among particle, dispersion stabilizer and organic solvent. For this end, if this balance is destroyed, the settlement due to particle agglomeration or the increase of viscosity due to particle dissolution or gellation occurs. As the balance among the three components, there are considered the following two relations (A) and (B):

|  | (A) | (B) |
|---|---|---|
| Polarity of particle | high | low |
| Polarity of dispersion stabilizer | low | high |
| Polarity of organic solvent | low | high |

In the relation (B), vinyl type monomer forming particles must have a low polarity. However, since the glass transition temperature is usually low in the polymerization of such a low polarity vinyl type monomer, the particles made from the vinyl type monomer become fairly soft. On the other hand, the synthesis of the non-aqueous polymer dispersion is usually carried out by radical polymerization, so that the temperature in the synthesis is frequently more than about 60° C. Therefore, the relation (B) is not so favorable because there is a high possibility of causing the fusing between particles in the synthesis of the non-aqueous polymer dispersion.

On the contrary, the relation (A) does not cause the problem as mentioned above and is favorable. In order to obtain a stable non-aqueous polymer dispersion, therefore, it is desirable that the polarity of particle is higher and the polarities of dispersion stabilizer and organic solvent are lower. Many of the conventional non-aqueous polymer dispersions are synthesized on the basis of this technical idea, and in this case, the polarity of the dispersion stabilizer is made considerably low.

For instance, a method of synthesizing a non-aqueous polymer dispersion by using a graft copolymer composed mainly of methyl methacrylate and having 5 mol condensed structure of 12-hydroxy stearic acid in its side chain as a dispersion stabilizer is disclosed in Japanese Patent Application Publication No. 43-16,147 and Japanese Patent laid open No. 54-150,439. According to this method, the polarities of the dispersion stabilizer and organic solvent are considerably low, so that even when the ratio of particle to dispersion stabilizer is high, the non-aqueous polymer dispersion having a small particle size can be obtained stably.

On the other hand, when the high molecular weight melamine resin is used as the dispersion stabilizer, the effect of stabilizing dispersion of particles is small as compared with the case of using the graft copolymer. Therefore, this case is suitable for the synthesis at a low level of particle concentration, wherein the particle size is large.

Therefore, in order to effectively develop the fluidity controlling function for the coating and the increase of solid content at a smaller amount of the dispersion stabilizer, it is considered that the use of the non-aqueous polymer dispersion containing the graft copolymer as the dispersion stabilizer is suitable.

As a curing agent, low molecular weight alkyletherified melamine resin is used from viewpoints of storage stability of coating, pot life, toxicity, handling easiness, cost and the like, while low molecular weight polyol resin is often used as a base resin.

In order to bake and cure the higher solid coating comprised of the above components, it is usually required to use an acid catalyst for promoting ether exchange reaction between the alkyletherified melamine resin and the low molecular weight polyol resin.

As the acid catalyst, there have hitherto been known aromatic sulfonic acids such as P-toluene sulfonic acid, dodecyl benzenesulfonic acid, dinonyl naphthalenesulfonic acid, dinonyl naphthalenedisulfonic acid and so on (Paint & Resin, pp26-28, March/April, 1982). These aromatic sulfonic acids are used in form of a salt blocked with a tertiary amine or an ester with an epoxy compound for improving the storage stability of the coating as disclosed in Japanese Patent laid open No. 52-127,927.

In the conventional non-aqueous polymer dispersions, however, since the polarity of the dispersion stabilizer is set to a low value as previously mentioned, when such a dispersion stabilizer is mixed with a relatively high polarity resin such as thermosetting resin for ordinary coatings, the compatibility becomes insufficient, so that the particle agglomeration is caused or the muddiness or delustering is caused in the cured film.

For example, when the non-aqueous polymer dispersion produced by the method as disclosed in Japanese Patent Application Publication No. 43-16,147 and Japanese Patent laid open No. 54-150,439 is mixed with a relatively high polarity resin such as an acrylic resin having a high acid value or hydroxyl value, a short oil type alkyd resin or the like, since the polarity of the dispersion stabilizer is too low, the compatibility with the resin having a relatively high polarity becomes insufficient, so that the pigment agglomeration and the like are caused to easily injure the appearance of the coated film.

As the acid catalyst, the conventional aromatic sulfonic acid has a difficult point in the solubility in organic solvent, so that when the aromatic sulfonic acid is particularly used in form of a salt blocked with a tertiary amine, it may be crystallized in the coating to form bittiness in the coated film. On the other hand, when the aromatic sulfonic acid is used in form of an ester with an epoxy compound, the solubility is improved. In the latter case, however, since the dissociation efficiency to original aromatic sulfonic acid is low, the acid catalyst is required to be used in a large amount, so that a large amount of the acid catalyst remains in the coating, resulting in the occurrence of color change in the coated film.

SUMMARY OF THE INVENTION

The inventors have made various studies with respect to a method of overcoming the aforementioned problems, and found that when a product obtained by polymerizing a high molecular weight monomer consisting of liner polyester compound having vinyl group in its terminal (hereinafter referred to as vinyl type monomer containing polyester chain group) or copolymerizing it with a second vinyl type monomer is used as a dispersion stabilizer in the non-aqueous polymer dispersion, it has an excellent dispersion stability and is compatible with a wide-range resin for coatings and is excellent in the sagging effect because of small particle size. Furthermore, it has been found that when an aliphatic sulfonic acid compound having a carbon number of 4–22 is used in form of a salt blocked with a tertiary amine as an acid catalyst, the bittiness is not produced in the coated film, or when the above compound is used at a large amount in form of an ester with an epoxy compound, it exhibits a very excellent stability on the color change of the coated film, and as a result, the invention has been accomplished.

According to the invention, there is the provision of a higher solid coating composition, comprising 100 parts by weight of a solid resin mixture composed of 30~90 parts by weight of a polyol resin and 10~70 parts of weight of an alkyletherified melamine resin, 0.2~10 parts by weight of an aliphatic sulfonic acid compound having a carbon number of 4~22 as an aliphatic sulfonic acid, and 1~100 parts by weight as a polymer solid content of a non-aqueous polymer dispersion consisting of 40~80% by weight of (a) an organic solvent component, 10~50% by weight of (b) a particle component insoluble in the component (a) and 5~40% by weight of (c) a dispersion stabilizer component soluble in the component (a) and capable of stably dispersing the component (b) into the component (a);

said dispersion stabilizer component being preferably obtained by polymerizing 20~100% by weight of a vinyl type monomer containing polyester chain group of the following general formula with 0~80% by weight of a second vinyl type monomer:

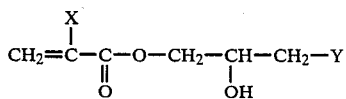

wherein X is a hydrogen atom or a methyl group, Y is

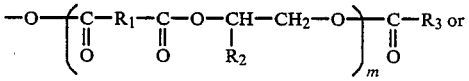

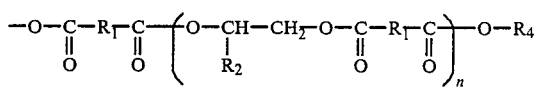

m and n are 1~10, respectively, $R_1$ is a residue of acid anhydride having a carbon number of 2~6, $R_2$ is a phenyl group, an alkyl or aromatic group having a carbon number of 5~19,

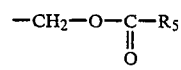

group ($R_5$ is an alkyl or aromatic group having a carbon number of 3~17), or —$CH_2$—O—$R_6$ group ($R_6$ is an alkyl or aromatic group having a carbon number of 4~18), $R_3$ is an alkyl group or a residue of aromatic monocarboxylic acid having a carbon number of 1~20, and $R_4$ is a residue of saturated aliphatic, alicyclic or aromatic monovalent alcohol having a carbon number of 1~18.

DESCRIPTION OF THE PREFERRED EMBODIMENTS

The polyol resin used in the invention has no restriction. For example, there may optionally be selected from acrylic resin, polyester resin, alkyd resin, epoxy resin, polyurethane resin, fluorine resin, silicone resin and the like in accordance with the properties of the objective coated film.

On the other hand, the alkyletherified melamine resin used in the invention is suitable to have an alkyl group having a carbon nubmer of not more than 8 and a number-average molecular weight of not more than 1,000, which is particularly preferable when being applied to a higher solid coating. When the carbon number of the alkyl group exceeds 8, the water resistance of the resulting cured film lowers, while when the number-average molecular weight exceeds 1,000, it is difficult to increase the solid content of the coating.

For example, such an alkyletherified melamine resin is commercially available as a trade name of Cymel 300, Cymel 301, Cymel 303, Cymel 350, Cymel 1116, Cymel 1130 (made by Mitsui Cyanamid Co., Ltd.), Nikalac MW-30, Nikalac NW-22A, Nikalac MX-40, Nikalac MX-45 (made by Sanwa Chemicals Co., Ltd.), Resimene 730, Resimene 731, Resimene 735, Resimene 745, Resimene 746, Resimene 747, Resimene 753, Resimene 755, Resiment 764 (made by Monsanto Co.), U-van 120 (made by Mitsui Toatsu Chemicals, Inc.) and the like.

As the mixing ratio of polyol resin to alkyletherified melamine resin, it is necessary that the alkyletherified melamine resin is within a range of 10~70 parts by weight to 30~90 parts by weight of the polyol resin.

When the amount of polyol resin is less than 30 parts by weight, the chemical resistance of the resulting coated film lowers, while when it exceeds 90 parts by weight, the water resistance of the coated film lowers.

The aliphatic sulfonic acid compound is used as an acid catalyst and includes aliphatic sulfonic acids and compounds isolating aliphatic sulfonic acid in the baking of the coating, such as salts of aliphatic sulfonic acid with tertiary amines, esters of aliphatic sulfonic acid with epoxy compounds and so on. The aliphatic sulfonic acid can be obtained by converting a salt of aliphatic sulfonic acid such as sodium salt, potassium salt or the like into a free acid through the removal of sodium of potassium.

For instance, the following aliphatic sulfonic acid salts may be mentioned as a starting material:

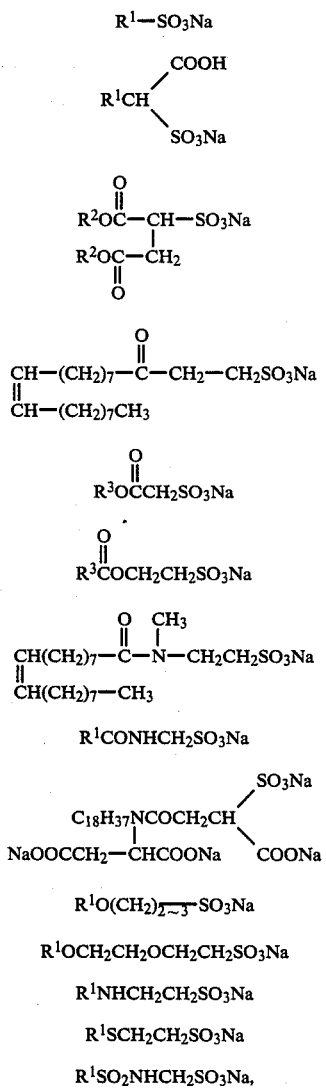

wherein $R^1$ is an alkyl group having a carbon number of 8~22, $R^2$ is an alkyl group having a carbon number of 4~8 and $R^3$ is an alkyl group having a carbon number of 13~17.

These aliphatic sulfonic acid salts can be converted into respective free acids through the removal of sodium or potassium with an inorganic acid. Moreover, the aliphatic sulfonic acid salt having a carbon number of less than 4 has a difficult point in the solubility in organic solvent likewise the case of the conventional aromatic sulfonic acid. As the inorganic acid, use may be made of sulfuric acid, hydrochloric acid, nitric acid, phosphoric acid and so on. In this case, the amount of the inorganic acid used is not restricted, but it is preferably within a range of 0.5~1.5 times to equivalent of aliphatic sulfonic acid salt for preventing the film performances, particularly water resistance of the resulting coated film. When the amount of the inorganic acid is less than 0.5 equivalent, the unreacted aliphatic sulfonic acid salt remains, while when it exceeds 1.5 equivalent, byproducts are produced from the aliphatic sulfonic acid salt, resulting in the undesirable reduction of water resistance of the coated film. The removal of sodium or potassium can quantitatively be carried out at room temperature according to the usual manner.

According to the invention, the aliphatic sulfonic acid itself may be used as the aliphatic sulfonic acid compound. In order not to injure the storage stability of the coating, it is preferable to use a compound isolating aliphatic sulfonic acid in the baking of the coating such as tertiary amine salt, ester with epoxy compound or the like as in the case of the conventional aromatic sulfonic acid as an acid catalyst. As the tertiary amine, mention may be made of N,N-dimethyl benzylamine, N,N-dimethyl ethanolamine, pyridine, N-methyl piperidine and so on. As the epoxy compound, mention may be made of versatic acid glycidyl ester, p-t-butyl benzoic acid glycidyl ester, phenyl glycidyl ether, glycidol and so on.

The amount of aliphatic sulfonic acid compound added can optionally be determined in accordance with the objective film performances, but it is used within a range of 0.2~10 parts by weight, preferably 0.4~8 parts by weight as aliphatic sulfonic acid per 100 parts by weight as a resin solid of a mixture of polyol resin and alkyletherified melamine resin likewise the case of the conventional aromatic sulfonic acid compound. When the addition amount is less than 0.1 part by weight, the acid catalyst effect is not effectively developed, while when it exceeds 10 parts by weight, the water resistance of the coated film undesirably lowers.

Particularly, the aliphatic sulfonic acid compound according to the invention can effectively develop the catalyst effect when the higher solid coating is a thermosetting resin mixture consisting of low molecular weight alkyletherified melamine resin and polyol resin.

The aliphatic sulfonic acid compound used in the invention is excellent in the solubility in organic solvent as compared with the aromatic sulfonic acid compound, and does not cause the bittiness even in form of the tertiary amine salt, and exhibits an excellent stability against the color change of coated film even in form of the ester with epoxy compound.

On the other hand, the non-aqueous polymer dispersion is excellent in the dispersion stability because the dispersion stabilizer component has a graft copolymer structure having a relatively low polarity polyester chain group as a side chain and a hydroxyl group in the vicinity of main chain, so that it may easily be mixed with another resin for the coating, for example, a high polarity resin such as oil-free polyester resin or the like. This is considered due to the fact that the polarity is not extremely reduced because the polyester chain group in the dispersion stabilizer component of the non-aqueous polymer dispersion used in the invention has a relatively high content of ester bond, while the polarity is properly increased as a whole of molecule because of the presence of hydroxyl group. In order to obtain the non-aqueous polymer dispersion having the improved dispersion stability as mentioned above, the polarity of the dispersion stabilizer is necessary to be as low as possible. In this connection, the dispersion stabilizer used in the non-aqueous polymer dispersion according to the invention has a high polarity hydroxyl group in a joint portion between the main chain and the relatively low polarity polyester chain group of the side chain, so that the particles are easily solvated in the non-aqueous polymer dispersion without causing entanglement between main chain and side chain to prevent the occurrence of agglomeration. Therefore, the dispersion stability of the non-aqueous polymer dispersion according to the invention is excellent though the polarity is higher as compared with that of the conventional dispersion stabilizer. That is, the non-aqueous polymer dispersion used in the invention is excellent in the dispersion stability and compatible with the other wide-range resins for the coatings.

In order to synthesize the dispersion stabilizer for the non-aqueous polymer disperion used in the invention, there are two methods, i.e. homopolymerization of vinyl type monomer containing polyester chain group and copolymerization of this monomer with second vinyl type monomer. The vinyl type monomer containing polyester chain group according to the invention may be obtained by the following two methods:

That is, the first method is as follows. A monocarboxylic acid of $R_3$—COOH and a monofunctional epoxy compound of

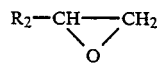

are esterified at 100°~180° C., preferably 120°~160° C. and then the resulting secondary hydroxyl group is esterified with an acid anhydride of

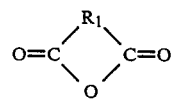

at 100°~180° C., preferably 120°~160° C. to obtain a reaction intermediate having a carboxyl group in terminal of molecule. Thereafter, the carboxyl group of the reaction intermediate is esterified with a monofunctional epoxy compound of

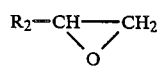

under the above condition and further the resulting secondary hydroxyl group is esterified with an acid anhydride of

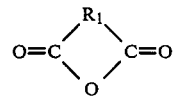

under the above condition to obtain a reaction intermediate having a carboxyl group in terminal of molecule having polyester chain longer than that of the aforementioned reaction intermediate. Such a reaction procedure is repeated 1~10 times to obtain a polyester compound having a carboxyl group in terminal of molecule with a given molecular weight. Then, the carboxyl group of the resulting polyester compound is esterified with a vinyl type monomer containing glycidyl group such as glycidyl acrylate, glycidyl methacrylate or the like at 80°~160° C., preferably 100°~140° C. to obtain a vinyl type monomer containing polyester chain group.

The second method is as follows. A monovalent alcohol of $R_4$—OH and an acid anhydride of

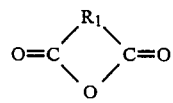

are esterified at 100°~180° C., preferably 120°~160° C. to obtain a reaction intermediate having a carboxyl group in terminal of molecule. Then, the reaction intermediate is repeatedly subjected to successive esterification reaction with a monofunctional epoxy compound of

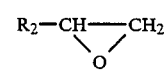

and with an acid anhydride of

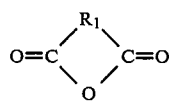

1~10 times in the same manner as in the first method to obtain a polyester compound having a carboxyl group in terminal of molecule. Thereafter, the carboxyl group of the resulting polyester compound is esterified with the aforementioned vinyl type monomer containing glycidyl group at 80°~160° C., preferably 100°~140° C. to obtain a vinyl type monomer containing polyester chain group.

In the production of the polyester compound having a carboxyl group in terminal of molecule by the first and second methods, when the repeated number of successive esterification reaction using the monofunctional epoxy compound of

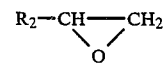

and the acid anhydride of

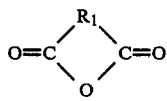

is less than 1, the effect of stabilizing particles by the dispersion stabilizer is not sufficiently developed and consequently the dispersion stability of the resulting non-aqueous polymer dispersion unfavorably lowers.

On the other hand, when the repeated number of the successive esterification reaction exceeds 10, the polymerizability of vinyl type monomer containing polyester chain group obtained at subsequent step lowers, and consequently the molecular weight distribution of the dispersion stabilizer becomes unfavorably wider and also the dispersion stability of the resulting non-aqueous polymer dispersion lowers.

As the monofunctional epoxy compound represented by

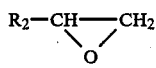

in the first and second methods, mention may be made of styrene oxide having a phenyl group; phenyl glycidylether, p-tolyl glycidylether or n-butyl glycidylether having a glycidylether group; versatic acid glycidylester or p-tert-butyl benzoic acid glycidylester having a glycidylester group; α-olefin oxide having an alkyl group, and the like.

As the acid anhydride represented by

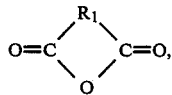

mentioned may be made of maleic anhydride, succinic anhydride, hexahydro-phthalic anhydride, tetrabromophthalic anhydride, tetrachloro-phthalic anhydride and so on.

As the monocarboxylic acid represented by $R_3$—COOH in the first method, mention may be made of acetic acid, propionic acid, caprylic acid, nonanic acid, caprilic acid, lauric acid, myristic acid, palmitic acid, stearic acid, isononanic acid, 2-ethyl hexanoic acid, arachic acid having an alkyl group; benzoic acid, p-tert-butyl benzoic acid having an aromatic group, and the like.

As the monovalent alcohol represented by $R_4$—OH in the second method, mention may be made of saturated aliphatic alcohols such as methyl alcohol, ethyl alcohol, n-propyl alcohol, isopropyl alcohol, n-butyl alcohol, isobutyl alcohol, t-butyl alcohol, amyl alcohol, n-hexyl alcohol, n-heptyl alcohol, 2-ethylhexyl alcohol, lauryl alcohol, stearyl alcohol; alicyclic alcohols such as cyclopentanol, cyclohexanol; aromatic alcohols such as benzyl alcohol, p-tert-butyl benzyl alcohol, and the like.

In the first and second methods, the esterification reaction between hydroxy group and acid anhydride and the esterification reaction between carboxyl group and monofunctional epoxy compound are carried out at a temperature of 100°~180° C., preferably 120°~160° C. When the reaction temperature is lower than 100° C., the long reaction time is required, while when it exceeds 180° C., the side reaction such as dehydration or the like is unfavorably caused to lower the dispersion stability of the resulting non-aqueous polymer dispersion. In these esterification reactions, an ordinary catalyst for the esterification such as N,N-dimethyl benzylamine, dimethyl laurylamine, triphenylphosphine or the like may be used for completing the esterification reaction in a shorter time. On the other hand, the esterification reaction between polyester compound having the carboxyl group in terminal of molecule and vinyl type monomer containing glycidyl group in the first and second methods is carried out at a temperature of 80°~160° C., preferably 100°~140° C. The vinyl type monomer containing glycidyl group includes glycidyl acrylate and glycidyl methacrylate. When the reaction temperature is lower than 80° C., the long reaction time is required, while when it exceeds 160° C., the vinyl group is unfavorably thermal-polymerized to lower the dispersion stability of the resulting non-aqueous polymer dispersion. This esterification can be completed in a shorter time by using the ordinary esterification catalyst as mentioned above.

As the second vinyl type monomer used in the dispersion stabilizer of the non-aqueous polymer dispersion according to the invention, mention may be made of acrylates such as methyl acrylate, ethyl acrylate, n-propyl acrylate, isopropyl acrylate, n-butyl acrylate, isobutyl acrylate, t-butyl acrylate, n-hexyl acrylate, cyclohexyl acrylate, 2-ethylhexyl acrylate, lauryl acrylate, stearyl acrylate, 2-hydroxyethyl acrylate, 2-hydroxypropyl acrylate, benzyl acrylate, glycidyl acrylate and the like; methacrylates such as methyl methacrylate, ethyl methacrylate, n-propyl methacrylate, isopropyl methacrylate, n-butyl methacrylate, isobutyl methacrylate, t-butyl methacrylate, n-hexyl methacrylate, cyclohexyl methacrylate, 2-ethylhexyl methacrylate, lauryl methacrylate, stearyl methacrylate, 2-hydroxyethyl methacrylate, 2-hydroxypropyl methacrylate, benzyl methacrylate, glycidyl methacrylate and the like; acrylic acid, methacrylic acid, acrylamide, methacrylamide, vinyl acetate, vinyl propionate, vinyl butyrate, vinyl caproate, styrene, vinyltoluene, itaconic acid, crotonic acid, fumaric acid, maleic acid, butadiene, vinyl chloride, vinylidene chloride, acrylonitrile, methacrylonitrile, dibutyl fumarate, maleic anhydride, dodecynyl succinic anhydride, allyl glycidylether, allyl alcohol and so on. These monomers may be used alone or in admixture.

The glass transition temperature, acid value, hydroxyl value, epoxy equivalent, refractive index, solubility and the like of the dispersion stabilizer in the non-aqueous polymer dispersion according to the invention may be adjusted in accordance with the required film performances by using the above second vinyl type monomers.

The second vinyl type monomer as mentioned above is used in an amount of not more than 80% by weight in the components constituting the dispersion stabilizer. When the amount exceeds 80% by weight, the dispersion stability of the resulting non-aqueous polymer dispersion undesirably lowers.

The dispersion stabilizer component in the non-aqueous polymer dispersion is used in an amount of 5~40% by weight based on the total weight of the non-aqeuous polymer dispersion. When the amount of the dispersion stabilizer is less than 5% by weight, the dispersion stability of the resulting non-aqueous polymer dispersion is insufficient and the particle components are agglomerated. while when it exceeds 40% by weight, the formation of particle component is insufficient and the fluidity controlling function when being applied to a higher solid coating is insufficient.

As the organic solvent component used in the non-aqueous polymer dispersion according to the invention, use may be made of any organic solvents dissolving the dispersion stabilizer but exhibiting insolubility against the particle component, an example of which includes aliphatic hydrocarbons such as n-hexane, cyclohexane, methylcyclohexane, ethylcyclohexane, n-heptane, n-octane, mineral spirit and the like; aromatic hydrocarbons such as benzene, toluene, xylene, ethylbenzene and the like; alcohols such as methyl alcohol, ethyl alcohol, n-propyl alcohol, isopropyl alcohol, n-butyl alcohol, isobutyl alcohol, and the like; acetic acid esters such as methyl acetate, ethyl acetate, n-propyl acetate, isopropyl acetate, n-butyl acetate, isobutyl acetate, cellosolve acetate and the like; ketones such as acetone, methylethyl ketone, methylisobutyl ketone, methylamyl ketone, cyclohexanone, isophorone and so on. These organic solvents may be used alone or in admixture. In order to stably produce the non-aqueous polymer dispersion, however, the organic solvent is necessary to have a polarity lower than that of the particle component within a range dissolving the dispersion stabilizer component. Furthermore, the amount of the organic solvent used is required to be within a range of 40~80% by weight based on the total weight of the non-aqueous polymer dispersion. When the amount is less than 40% by weight, the dispersion stability of the resulting non-aqueous polymer dispersion is insufficient and the particle components are agglomerated, while when it exceeds 80% by weight, it is required to concentrate the resulting non-aqueous polymer dispersion and hence the production efficiency of the dispersion undesirably lowers.

The non-aqueous polymer dispersion used in the invention is obtained by dissolving the dispersion stabilizer component into the organic solvent component and then polymerizing in the resulting solution a vinyl type monomer as a starting material for particle component insoluble in the component (a). As the vinyl type monomer to be polymerized, one or more of the second vinyl type monomers used in the formation of the dispersion stabilizer component may optionally be selected, but it is necessary to use the vinyl type monomer having a polarity higher than that of the dispersion stabilizer component in order to stably produce the non-aqueous polymer dispersion. In this case, the particle component is formed in an amount of 10~50% by weight based on the total weight of the non-aqueous polymer dispersion. When the amount is less than 10% by weight, the formation of particle component is insufficient and the fluidity controlling function when being applied to a higher solid coating is insufficient, while when it exceeds 50% by weight, the dispersion stability of the resulting non-aqueous polymer dispersion is insufficient and the particle components are undesirably agglomerated.

The thus obtained non-aqueous polymer dispersion is used in an amount of 1~100 parts by weight as a polymer solid content based on 100 parts by weight of a solid resin mixture of polyol resin and alkyletherified melamine resin. When the amount as polymer solid content is 1 part by weight, the fluidity controlling function for the higher solid coating is insufficient, while when it exceeds 100 parts by weight, the chemical resistance of the resulting coated film undesirably lowers.

The higher solid coating composition according to the invention consists mainly of the polyol resin and the alkyletherified melamine resin, the aliphatic sulfonic acid compound and the non-aqueous polymer dispersion and may contain additives such as a pigment, a dyestuff, a glass flake, an aluminum flake, a dispersion stabilizer, a viscosity adjuster, a leveling agent, a gelation preventing agent, an ultraviolet ray absorber and others, an organic solvent and the like, if necessary.

The higher solid coating composition according to the invention is produced by mixing the above components by means of a dispersing equipment used in the production of ordinary coatings such as ball mill, paint shaker, sand mill, attriter, roll mill, kneader or the like.

The thus obtained coating is applied to an ordinary substrate such as metal or other inorganic substrate, plastics or other organic substrate by the usual application process such as air spraying, airless spraying, electrostatic spraying, diping or the like, and then dried by baking to form a coated film thereon. In this case, it is preferable that the baking and drying are carried out under such a condition that aliphatic sulfonic acid is isolated from the aliphatic sulfonic acid compound and causes a crosslinking reaction between polyol resin and alkyletherified melamine resin, i.e. they are generally carried out at a temperature of 80°~180° C. for 20~60 minutes. When the baking and drying are carried out under the above condition, the aliphatic sulfonic acid isolated from the aliphatic sulfonic acid compound serves as an acid catalyst to cause the curing of the coated film.

In the higher solid coating composition according to the invention, since the acid catalyst used has a molecular structure directly bonding long chain aliphatic group to sulfonic acid group, the solubility in organic solvent is excellent, and the occurrence of bittiness is prevented even in form of a salt blocked with tertiary amine, and the stability to color change of coated film is very excellent even in form of an ester with epoxy compound, so that there is obtained a coated film having excellent film appearance and water resistance. The dispersion stabilizer component in the non-aqueous polymer dispersion used has a graft copolymer structure having a polyester chain group of relatively high ester bond content as a side chain and a high polarity hydroxyl group in joint portion between side chain and main chain as compared with the conventional low polarity graft copolymer, so that though the polarity as a whole of molecule is high as compared with the conventional dispersion stabilizer, the solvation can easily be achieved without causing entanglement between side chain and main chain. Therefore, the resulting non-aqueous polymer dispersion is excellent in the dispersion stability and compatible with a relatively high polarity resin such as an acrylic resin having a high acid or hydroxyl value or short-oil type alkyd resin or the like and also excellent in the sagging prevention effect because of small particle size, so that the film appearance can considerably be improved as compared with the case of using the conventional non-aqueous polymer dispersion.

The following examples are given in the illustration of the invention and are not intended as limitations thereof. Unless otherwise specified, part and percentage are by weight.

PRODUCTION EXAMPLE 1

A mixture of 356.0 parts of $C_{18}H_{37}SO_3Na$ and 861.4 parts of n-butyl alcohol was charged into a three-necked flask provided with a stirrer, to which was added 98.1 parts of 37% hydrochloric acid at room temperature with stirring to conduct removal of sodium.

In this case, the reaction proceeded just after the addition of hydrochloric acid to precipitate 58.5 parts of NaCl. After the precipitated NaCl was filtered off by suction, the resulting filtrate was added with 79.0 parts of pyridine to obtain an aliphatic sulfonic acid compound blocked with equimole of pyridine and having an effective component concentration (aliphatic sulfonic acid) of 25%.

PRODUCTION EXAMPLES 2–8

The same procedure as in Production Example 1 was repeated by using an aliphatic sulfonate, and inorganic acid and a tertiary amine as shown in the following Table 1 to obtain a solution of aliphatic sulfonic acid compound blocked with equimole of respective tertiary amine and having an effective component concentration (aliphatic sulfonic acid) of 25%. Moreover, 58.5 parts of NaCl in Production Examples 2 and 6~8, 71.0 parts of $Na_2SO_4$ in Production Example 3 and 85.0 parts of $NaNO_3$ in Production Examples 4 and 5 were precipitated, respectively, in the removal of sodium.

PRODUCTION EXAMPLE 9

A mixture of 493.3 parts of

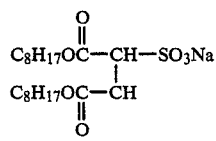

and 623.8 parts of methylethyl ketone was charged into a three-necked flask, to which was added 98.1 parts of hydrochloric acid at room temperature with stirring to conduct the removal of sodium. In this case, 58.5 parts of NaCl was precipitated as the reaction proceeded immediately. After the precipitated NaCl was filtered off by suction, the resulting filtrate was charged into a four-necked flask provided with a stirrer, a reflux condenser, a thermometer and a dropping funnel, to which was added dropwise 250.0 parts of Kardula E10 (versatic acid glycidyl ester, epoxy equivalent: 250, trade name, made by Yuka Shell Epoxy Kabushiki Kaisha) at room temperature through the dropping funnel over 30 minutes with stirring. After the completion of the dropwise addition, the stirring was continued at room temperature for 4 hours, and the reaction was stopped when the acid value of involatile matter was not more than 1, whereby there was obtained an aliphatic sulfonic acid compound esterified with equimole of Kardula E10 and having an effective component concentration (aliphatic sulfonic acid) of 30%.

PRODUCTION EXAMPLES 10–11

The same procedure as in Production Example 9 was repeated by using an aliphatic sulfonate, an inorganic acid and an epoxy compound as shown in Table 1 to obtain a solution of aliphatic sulfonic acid compound esterified with equimole of respective epoxy compound and having an effective component concentration (aliphatic sulfonic acid) of 30%. Moreover, 58.5 parts of NaCl and 71.0 parts of $Na_2SO_4$ were precipitated in the removal of sodium in Production Examples 10 and 11, respectively.

TABLE 1(a)

unit: part by weight

| | | Production Example | | | | | | | | |
|---|---|---|---|---|---|---|---|---|---|---|
| | | 2 | 3 | 4 | 5 | 6 | 7 | 8 | 10 | 11 |
| Aliphatic sulfonate | $C_{16}H_{33}CH(SO_3Na)COOH$ | 386.0 | | | | | | | | |
| | $C_{17}H_{35}-OCCH_2SO_3Na$ (O) | | 400.0 | | | | | | | |
| | $C_{18}H_{37}OCH_2CH_2SO_3Na$ | | | 400.0 | | | | | | |
| | $C_{18}H_{37}(OCH_2CH_2)_2SO_3Na$ | | | | 444.0 | | | | | |
| | $C_8H_{17}SO_3Na$ | | | | | 216 | | | | |
| | $C_{12}H_{25}SO_3Na$ | | | | | | 272 | | | |
| | $C_{13}H_{27}COCH_2CH_2SO_3Na$ (O) | | | | | | | 358 | | |
| | $CH(CH_2)_7COCH_2CH_2SO_3Na$ / $CH(CH_2)_7CH_3$ (O) | | | | | | | | | 412.0 |
| | $C_{17}H_{35}COCH_2CH_2SO_3Na$ (O) | | | | | | | | | 414.0 |
| | n-butyl alcohol | 951.4 | 1,054.0 | 959.4 | 1,137.4 | 441.4 | 553.4 | 857.4 | | |
| | methyl ethyl ketone | | | | | | | | 698.4 | 663.7 |

TABLE 1(b)

unit: part by weight

| | | Production Example | | | | | | | | |
|---|---|---|---|---|---|---|---|---|---|---|
| | | 2 | 3 | 4 | 5 | 6 | 7 | 8 | 10 | 11 |
| Inorganic acid | 37.2% hydrochloric acid | 98.1 | | | | 98.1 | 98.1 | 98.1 | 98.1 | |
| | 96.0% sulfuric acid | | 51.0 | | | | | | | 51.0 |
| | 61.4% nitric acid | | | 102.6 | 102.6 | | | | | |
| Tertiary amine | pyridine | 79.0 | 79.0 | | | 79.0 | | | | |
| | N,N—dimethyl benzylamine | | | 135.0 | | | 135.0 | | | |
| | N,N—dimethyl ethanolamine | | | | 89.0 | | | 89.0 | | |
| Epoxy compound | phenyl glycidyl ether | | | | | | | | 150.0 | |
| | Kardula E10 | | | | | | | | | 250.0 |
| mol ratio of aliphatic sulfonate/inorganic acid | | 1/1 | 1/1 | 1/1 | 1/1 | 1/1 | 1/1 | 1/1 | 1/1 | 1/1 |
| mol ratio of aliphatic sulfonate/tertiary amine | | 1/1 | 1/1 | 1/1 | 1/1 | 1/1 | 1/1 | 1/1 | | |
| mol ratio of aliphatic sulfonate/epoxy compound | | | | | | | | | 1/1 | 1/1 |

PRODUCTION EXAMPLE 12

A mixture of 190.0 parts of p-toluene sulfonic acid monohydrate and 419.0 parts of isopropyl alcohol was charged into the same three-necked flask as in Production Example 1 and stirred at room temperature. The resulting solution was added with 79.0 parts of pyridine to obtain a solution of pyridine salt of p-toluene sulfonic acid blocked with equimole of pyridine and having an effective component concentration (aromatic sulfonic acid) of 25%.

PRODUCTION EXAMPLE 13

Into a four-necked flask provided with a stirrer, a thermometer, a constant water receiver with a reflux condenser and a nitrogen gas inlet was charged a mixture of 190.0 parts of p-toluene sulfonic acid monohydrate and 266.0 parts of xylene. The temperature was raised while blowing nitrogen gas and then the stirring was continued at 140° C. for 2 hours to remove 18 parts of water. After the reaction mass was cooled in air, the nitrogen gas inlet was replaced with a dropping funnel and 250.0 parts of Kardula E10 was added dropwise through the dropping funnel for 30 minutes while stirring at room temperature. After the completion of the dropwise addition, the stirring was continued at room temperature for 4 hours, and the reaction was stopped at an acid value of involatile matter of not more than 1 to obtain an ester solution of p-toluene sulfonic acid esterified with equimole of Kardula E10 and having an effective component concentration (aromatic sulfonic acid) of 25%.

PRODUCTION EXAMPLE 14

A mixture of 96.0 parts of methane sulfonic acid and 465.0 parts of isopropyl alcohol was charged into the same three-necked flask as in Production Example 1 and stirred at room temperature. The resulting solution was added with 79.0 parts of pyridine to obtain a solution of pyridine salt of methane sulfonic acid blocked with equimole of pyridine and having an effective component concentration (aliphatic sulfonic acid) of 15%.

PRODUCTION EXAMPLE 15

(a) Production of Vinyl Type Monomer Containing Polyester Chain Group

A mixture having the following composition was charged into a four-necked flask provided with a stirrer, a reflux condenser, a thermometer and a nitrogen gas inlet, the temperature of which was raised up to 140° C. with stirring.

| | |
|---|---|
| benzoic acid | 122.0 parts |
| Kardula E10 | 250.0 parts |
| phthalic anhydride | 148.0 parts |
| N,N—dimethylbenzylamine | 2.0 parts |
| xylene | 327.0 parts |

The stirring was continued at a temperature of 140° C. for 2 hours while blowing nitrogen gas to provide an acid value of involatile matter of 108, whereby a reaction intermediate having a carboxyl group in terminal of molecule was obtained. Then, the reaction intermediate was reacted with a mixture of Kardula E10/phthalic anhydride=250.0 parts/148.0 parts under the above reaction condition two times. When the acid value of involatile matter reached 43, the reaction was stopped to obtain a polyester compound solution having a carboxyl group in terminal of molecule with an involatile content of 80%. Then, a mixture containing this polyester compound solution and having the following composition was stirred at a temperature of 140° C. for 4 hours, and the reaction was stopped at an acid value of involatile matter of not more than 1 to obtain a solution of vinyl type monomer containing polyester chain group having an involatile content of 80%.

| | |
|---|---|
| above polyester compound solution | 1,645.0 parts |
| glycidyl methacrylate | 142.0 parts |
| hydroquinone | 2.0 parts |
| xylene | 35.0 parts |

(b) Production of Dispersion Stabilizer

Into a four-necked flask provided with a stirrer, a reflux condenser, a thermometer and a dropping funnel was charged 85.5 parts of xylene, which was heated to 95° C. while raising temperature with stirring. Then, a mixture having the following composition was added at a constant addition speed and a temperature of 95° C. over 2 hours and further held at 95° C. for 2 hours to obtain a dispersion stabilizer solution having an involatile content of 50%.

| | |
|---|---|
| above vinyl type monomer containing polyester chain group solution (a) | 62.5 parts |
| butyl methacrylate | 50.0 parts |
| t-butylperoxy-2-ethyl hexanoate | 2.0 parts |

(c) Production of Non-Aqueous Polymer Dispersion

Into a four-necked flask provided with a stirrer, a reflux condenser, a thermometer and a dropping funnel were charged 85.7 parts of the above dispersion stabilizer solution (b) and 57.1 parts of xylene, which was heated to 95° C. while raising temperature with stirring. Then, a mixture having the following composition was added at a constant addition speed and a temperature of 95° C. over 2 hours and further held at 95° C. for 2 hours to obtain an opaque white non-aqueous polymer dispersion having an involatile content of 40%, a viscosity at 20° C. of 0.8 poise and an average particle size of 0.18 μm.

| | |
|---|---|
| methyl methacrylate | 57.9 parts |
| acrylonitrile | 20.0 parts |
| 2-hydroxyethyl methacrylate | 20.0 parts |
| glycidyl methacrylate | 1.4 parts |
| acrylic acid | 0.7 part |
| xylene | 57.2 parts |
| mineral spirit | 55.2 parts |
| t-butylperoxy-2-ethyl hexanoate | 2.0 parts |

This dispersion was stable even after being left to stand at 20° C. for one month and exhibited no particle settlement, phase separation and viscosity change.

PRODUCTION EXAMPLES 16–18

(a) Production of Vinyl Type Monomer Containing Polyester Chain Group

Into the same four-necked flask as in Production Example 15(a) was charged a mixture having a composition as shown in the following Table 2, which was heated to 140° C. while raising temperature with stirring. At this temperature, the stirring was continued for 2 hours while introducing nitrogen gas thereinto to thereby obtain reaction intermediate solutions having a carboxyl group in terminal of molecule and acid values of involatile matter of 119 in Production Example 16, 120 in Production Example 17 and 102 in Production Example 18, respectively. then, the above reaction intermediate was reacted with a mixture having a composition as shown in the following Table 3 under the above condition 4 times in Production Example 16, 7 times in Production Example 17 and 5 times in Production Example 18, and the reaction was stopped at acid values of final involatile matter of 27 in Production Example 16, 24 in Production Example 17 and 30 in Production Example 18, respectively, to obtain a polyester compound solution having a carboxyl group in terminal of molecule with an involatile content of 80%. Thereafter, the polyester compound solution was stirred according to a compounding recipe as shown in the following Table 4 at a temperature of 140° C. for 4 hours and the reaction was stopped at an acid value of involatile matter of not more than 1 to obtain a vinyl type monomer containing polyester chain group solution having an involatile content of 80%.

TABLE 2

| | Production Example 16(a) (part) | Production Example 17(a) (part) | Production Example 18(a) (part) |
|---|---|---|---|
| propionic acid | 74.0 | | |
| lauric acid | | 200.0 | |
| stearic acid | | | 284.0 |
| Kardula E10 | 250.0 | | |
| phenyl glycidyl ether | | 150.0 | 150.0 |
| phthalic anhydride | 148.0 | | |
| succinic anhydride | | 118.0 | 118.0 |
| N,N—dimethyl benzylamine | 4.0 | 4.0 | 4.0 |
| xylene | 512.0 | 582.0 | 469.0 |

TABLE 3

| | Production Example 16(a) (part) | Production Example 17(a) (part) | Production Example 18(a) (part) |
|---|---|---|---|
| Kardula E10 | 250.0 | | |
| phenyl glycidyl ether | | 150.0 | 150.0 |
| phthalic anhydride | 148.0 | | |
| succinic anhydride | | 118.0 | 118.0 |

TABLE 4

| | Production Example 16(a) (part) | Production Example 17(a) (part) | Production Example 18(a) (part) |
|---|---|---|---|
| polyester compound solution | 2,580.0 | 2,930.0 | 2,365.0 |
| glycidyl methacrylate | 142.0 | 142.0 | 142.0 |
| hydroquinone | 2.0 | 2.0 | 2.0 |
| xylene | 35.0 | 35.0 | 35.0 |

(b) Production of Dispersion Stabilizer

Into the same four-necked flask as in Production Example 15(b) was charged xylene in an amount of 78.0 parts in Production Example 16, 91.7 parts in Production Example 17 or 85.5 parts in Production Example 18, which was heated to 95° C. while raising temperature with stirring. Then, a mixture having a composition as shown in the following Table 5 was added at a constant addition speed and a temperature of 95° C. over 2 hours and further held at 95° C. for 2 hours to obtain a dispersion stabilizer solution having an involatile content of 50%.

TABLE 5

| | Production Example 16(b) (part) | Production Example 17(b) (part) | Production Example 18(b) (part) |
|---|---|---|---|
| vinyl type monomer containing polyester chain group solution obtained in Production Example 16(a) | 100.0 | | |
| vinyl type monomer containing polyester chain group solution obtained in Production Example 17(a) | | 31.3 | |
| vinyl type monomer containing polyester chain group solution obtained in Production Example 18(a) | | | 62.5 |
| methyl methacrylate | 20.0 | | |
| 2-ethylhexyl methacrylate | | 75.0 | |
| butyl methacrylate | | | 50.0 |
| t-butylperoxy-2-ethyl | | | |

TABLE 5-continued

|  | Production Example 16(b) (part) | Production Example 17(b) (part) | Production Example 18(b) (part) |
|---|---|---|---|
| hexanoate | 2.0 | 2.0 | 2.0 |

(c) Production of Non-Aqueous Polymer Dispersion

The starting materials as shown in the following Table 6 were reacted in the same four-necked flask as in Production Example 15(c) by the same manner as in Production Example 15(c) to obtain an opaque white non-aqueous polymer dispersion having properties as shown in the following Table 7.

The dispersion was stable even after being left to stand at 20° C. for one month and exhibited no particle settlement, phase separation and viscosity change.

TABLE 6

| Starting material | Production Example 16(c) (part) | Production Example 17(c) (part) | Production Example 18(c) (part) |
|---|---|---|---|
| Dispersion stabilizer solution obtained in Production Example 16(b) | 163.0 | | |
| Dispersion stabilizer solution obtained in Production Example 17(b) | | 85.7 | |
| Initial charge | | | |
| Dispersion stabilizer solution obtained in Production Example 18(b) | | | 85.7 |
| xylene | 15.0 | 103.7 | 30.0 |
| mineral spirit | 30.0 | 180.0 | 27.1 |
| methyl methacrylate | 57.9 | 57.9 | 57.9 |
| acrylonitrile | 20.0 | 20.0 | 20.0 |
| 2-hydroxyethyl methacrylate | 20.0 | 20.0 | 20.0 |
| glycidyl methacrylate | 1.4 | 1.4 | 1.4 |
| Addition compound | | | |
| acrylic acid | 0.7 | 0.7 | 0.7 |
| xylene | 5.0 | 50.0 | 57.2 |
| mineral spirit | 15.0 | 50.0 | 55.2 |
| t-butylperoxy-2-ethyl hexoanate | 2.0 | 2.0 | 2.0 |

TABLE 7

|  | Production Example 16(c) (part) | Production Example 17(c) (part) | Production Example 18(c) (part) |
|---|---|---|---|
| involatile content (%) | 55 | 25 | 40 |
| viscosity (20° C.) (poise) | 2.5 | 0.7 | 0.9 |
| average particle size (μm) | 0.16 | 0.17 | 0.18 |

PRODUCTION EXAMPLES 19–23

(a) Production of Vinyl Type Monomer Containing Polyester Chain Group

Into the same four-necked flask as in Production Example 15(a) was charged a mixture having a composition as shown in the following Table 8, which was heated to 140° C. while raising temperature with stirring. The stirring was continued at this temperature for 2 hours while introducing nitrogen gas thereinto to obtain reaction intermediate solutions having a carboxyl group in terminal of molecule, and acid values of involatile matter of 214 in Production Example 19, 257 in Production Example 20, 145 in Production Example 21, 253 in Production Example 22 and 168 in Production Example 23, respectively. Then, the reaction intermediate solution was reacted with a mixture having a composition as shown in the following Table 9 under the same condition 2 times in Production Example 19, 5 times in Production Example 20, 10 times in Production Example 21 and 4 times in Production Examples 22 and 23, and the reaction was stopped at an acid value of final involatile matter of 57 in Production Example 19, 28 in Production Example 20, 20 in Production Example 21, 31 in Production Example 22 or 29 in Production Example 23 to obtain a polyester compound solution having a carboxyl group in terminal of molecule with an involatile content of 80%. The resulting polyester compound solution was stirred according to a compounding recipe as shown in the following Table 10 at a temperature of 140° C. for 4 hours, and the reaction was stopped at an acid value of involatile matter of not more than 1 to obtain a vinyl type monomer containing polyester chain group solution having an involatile content of 80%.

TABLE 8

|  | Production Example 19(a) (part) | Production Example 20(a) (part) | Production Example 21(a) (part) | Production Example 22(a) (part) | Production Example 23(a) (part) |
|---|---|---|---|---|---|
| benzyl alcohol | 108.0 | | | | |
| cyclohexyl alcohol | | 100.0 | | | |
| stearyl alcohol | | | 270.0 | | |
| n-butyl alcohol | | | | 74.0 | |
| lauryl alcohol | | | | | 186.0 |
| hexahydro-phthalic anhydride | 154.0 | | | | |
| succinic anhydride | | 118.0 | 118.0 | | |
| phthalic anhydride | | | | 148.0 | 148.0 |
| N,N—dimethyl benzylamine | 2.0 | 4.0 | 6.0 | 4.0 | 4.0 |
| xylene | 284.0 | 490.0 | 686.0 | 449.5 | 477.5 |

TABLE 9

|  | Production Example 19(a) (part) | Production Example 20(a) (part) | Production Example 21(a) (part) | Production Example 22(a) (part) | Production Example 23(a) (part) |
|---|---|---|---|---|---|
| AOE-X-24(a) | 205.0 | | | | |
| p-t-butyl benzoic acid | | 234.0 | | | |

TABLE 9-continued

| | Production Example 19(a) (part) | Production Example 20(a) (part) | Production Example 21(a) (part) | Production Example 22(a) (part) | Production Example 23(a) (part) |
|---|---|---|---|---|---|
| glycidylester Kardula E10 | | | | 250.0 | 250.0 |
| styrene oxide | | | 120.0 | | |
| hexahydro-phthalic anhydride | 154.0 | | | | |
| succinic anhydride | | 118.0 | 118.0 | | |
| phthalic anhydride | | | | 148.0 | 148.0 |

(a)  oxirane oxygen: 7.8%

$n = 9 \sim 11$ (trade name, made by Daisel Chemical Industries Ltd.)

TABLE 10

| | Production Example 19(a) (part) | Production Example 20(a) (part) | Production Example 21(a) (part) | Production Example 22(a) (part) | Production Example 23(a) (part) |
|---|---|---|---|---|---|
| polyester compound solution | 1,266.0 | 2,472.0 | 3,460.0 | 2,267.5 | 2,407.5 |
| glycidyl acrylate | 130.0 | | | | |
| glycidyl methacrylate | | 142.0 | 142.0 | 142.0 | 142.0 |
| hydroquinone | 2.0 | 2.0 | 2.0 | 2.0 | 2.0 |
| xylene | 30.0 | 35.0 | 35.0 | 35.0 | 35.0 |

(b) Production of Dispersion Stabilizer

Into the same four-necked flask as in Production Example 15(b) was charged xylene in an amount of 88.0 parts in Production Example 19, 73.0 parts in Production Example 20, 93.0 parts in Production Example 21 or 85.5 parts in Production Examples 22 and 23, which was heated to 95° C. while raising temperature with stirring. Then, a mixture having a composition as shown in the following Table 11 was added at a constant addition speed and a temperature of 95° C. over 2 hours and further held at 95° C. for 2 hours to obtain a dispersion stabilizer solution having an involatile content of 50%.

TABLE 11

| | Production Example 19(b) (part) | Production Example 20(b) (part) | Production Example 21(b) (part) | Production Example 22(b) (part) | Production Example 23(b) (part) |
|---|---|---|---|---|---|
| vinyl type monomer containing polyester chain group solution in Production Example 19(a) | 50.0 | | | | |
| vinyl type monomer containing polyester chain group solution in Production Example 20(a) | | 125.0 | | | |
| vinyl type monomer containing polyester chain group solution in Production Example 21(a) | | | 25.0 | | |
| vinyl type monomer containing polyester chain group solution in Production Example 22(a) | | | | 62.5 | |
| vinyl type monomer containing polyester chain group solution in Production Example 23(a) | | | | | 62.5 |
| methyl methacrylate | 30.0 | 30.0 | | | |
| butyl acrylate | 30.0 | | | | |
| butyl methacrylate | | | | 50.0 | 50.0 |
| lauryl methacrylate | | 50.0 | | | |
| t-butylperoxy-2-ethyl hexanoate | 2.0 | 2.0 | 2.0 | 2.0 | 2.0 |

(c) Production of Non-Aqueous Polymer Dispersion

The starting materials as shown in the following Table 12 were reacted in the same four-necked flask as in Production Example 15(c) by the same manner as in Production Example 15(c) to obtain an opaque white non-aqueous polymer dispersion having properties as shown in the following Table 13.

The above dispersion was stable even after being left to stand at 20° C. for one month and exhibited no particle settlement, phase separation and viscosity change.

TABLE 12

| | Starting materials | Production Example | | | | |
|---|---|---|---|---|---|---|
| | | 19(c) (part) | 20(c) (part) | 21(c) (part) | 22(c) (part) | 23(c) (part) |
| Initial charge | dispersion stabilizer solution of Production Example 19(b) | 50.0 | | | | |
| | dispersion stabilizer solution of Production Example 20(b) | | 107.7 | | | |
| | dispersion stabilizer solution of Production Example 21(b) | | | 466.7 | | |
| | dispersion stabilizer solution of Production Example 22(b) | | | | 85.7 | |
| | dispersion stabilizer solution of Production Example 23(b) | | | | | 85.7 |
| | xylene | 15.0 | 35.0 | — | 30.0 | 30.0 |
| | mineral spirit | 30.0 | 70.0 | 60.0 | 27.1 | 27.1 |
| | methyl methacrylate | 57.9 | 57.9 | 57.9 | 57.9 | 57.9 |
| | acrylonitrile | 20.0 | 20.0 | 20.0 | 20.0 | 20.0 |
| | 2-hydroxyethyl methacrylate | 20.0 | 20.0 | 20.0 | 20.0 | 20.0 |
| Addition compound | glycidyl methacrylate | 1.4 | 1.4 | 1.4 | 1.4 | 1.4 |
| | acrylic acid | 0.7 | 0.7 | 0.7 | 0.7 | 0.7 |
| | xylene | 10.3 | 24.9 | — | 57.2 | 57.2 |
| | mineral spirit | 20.0 | 45.0 | 38.0 | 55.2 | 55.2 |
| | t-butylperoxy-2-ethyl hexanoate | 2.0 | 2.0 | 2.0 | 2.0 | 2.0 |

TABLE 13

| | Production Example 19(c) (part) | Production Example 20(c) (part) | Production Example 21(c) (part) | Production Example 22(c) (part) | Production Example 23(c) (part) |
|---|---|---|---|---|---|
| involatile content (%) | 55 | 40 | 50 | 40 | 40 |
| viscosity (20° C.) (poise) | 3.2 | 1.3 | 2.1 | 0.8 | 0.8 |
| average particle size (μm) | 0.19 | 0.18 | 0.15 | 0.17 | 0.18 |

PRODUCTION EXAMPLE 24

(a) Production of Vinyl Type Monomer Containing Polyester Chain Group

Into the same four-necked flask as in Production Example 15(a) was charged a mixture having the following composition, which was heated to 140° C. while raising temperature with stirring:

| p-t-butyl benzoic acid | 178.0 parts |
|---|---|
| Kardula E10 | 250.0 parts |
| hexahydro-phthalic anhydride | 154.0 parts |
| N,N—dimethyl benzylamine | 1.0 part |
| xylene | 145.0 parts |

The stirring was continued at this temperature for 2 hours while introducing nitrogen gas thereinto to obtain a polyester compound solution having a carboxyl group in terminal of molecule with an involatile content of 80% and an acid value of involatile matter of 96.

The polyester compound solution was stirred according to the following compounding recipe at 140° C. for 4 hours and the reaction was stopped at an acid value of involatile matter of not more than 1 to obtain a vinyl type monomer containing polyester chain group solution having an involatile content of 80%:

| above polyester compound solution | 728.0 parts |
|---|---|
| glycidyl acrylate | 130.0 parts |
| hydroquinone | 1.0 part |
| xylene | 31.0 parts |

(b) Production of Dispersion Stabilizer

Into the same four-necked flask as in Production Example 15(b) was charged 83.0 parts of xylene, which was heated to 95° C. while raising temperature with stirring. Then, a mixture having the following composition was added at a constant addition speed and a temperature of 95° C. over 2 hours and further held at 95° C. for 2 hours to obtain a dispersion stabilizer solution having an involatile content of 50%:

| above vinyl type monomer containing polyester chain group solution (a) | 75.0 parts |
|---|---|
| methyl methacrylate | 20.0 parts |
| butyl methacrylate | 20.0 parts |
| t-butylperoxy-2-ethyl hexanoate | 2.0 parts |

(c) Production of Non-Aqueous Polymer Dispersion

The same method as in Production Example 15(c) was repeated except that the dispersion stabilizer solution of Production Example 24(b) was used instead of the dispersion stabilizer solution of Production Example 15(b) to obtain an opaque white non-aqueous polymer dispersion having an involatile content of 40%, a viscosity at 20° C. of 1.0 poise and an average particle size of 0.18 μm. This dispersion was stable even after being left to stand at 20° C. for one month and exhibited no particle settlement, phase separation and viscosity change.

PRODUCTION EXAMPLE 25

(a) Production of Vinyl Type Monomer

Into a four-necked flask provided with a stirrer, a thermometer, a quantitative water receiver with a reflux condenser and an inlet for nitrogen gas was charged 1,500 parts of 12-hydroxy stearic acid, which was stirred at 200° C. while raising temperature with stirring and blowing nitrogen gas. After the reaction was stopped at an acid value of 39, the reaction mass was cooled in air and added with 159 parts of xylene to obtain a 5 mole condensate solution of 12-hydroxy stearic acid having an involatile content of 90%. In this case, 72 parts of water was removed. Then, a mixture inclusive of the 5 mole condensate solution of 12-hydroxy stearic acid having the following composition was stirred in a four-necked flask provided with a stirrer, a thermometer, a reflux condenser and an inlet for nitrogen gas at a temperature of 120° C. to conduct an esterification reaction until the acid value of involatile matter was not more than 1.0, whereby a vinyl type monomer solution having an involatile content of 80% was obtained:

| | |
|---|---|
| 5 mole condensate solution of 12-hydroxy stearic acid | 1,586.67 parts |
| glycidyl methacrylate | 142.00 parts |
| N,N—dimethyl benzylamine | 3.93 parts |
| hydroquinone | 1.96 parts |
| xylene | 227.94 parts |

(b) Production of Dispersion Stabilizer

Into the same four-necked flask as in Production Example 15(b) were charged 285.00 parts of ethyl acetate and 142.50 parts of n-butyl acetate, which were refluxed with stirring. Then, a mixture having the following composition was added at a constant addition speed under reflux over 3 hours and further refluxed for 2 hours to obtain a dispersion stabilizer solution having an involatile content of 50%:

| | |
|---|---|
| above vinyl type monomer solution | (a)312.50 parts |
| methyl methacrylate | 245.00 parts |
| methacrylic acid | 5.00 parts |
| 2,2-azobisisobutyronitrile | 10.00 parts |

(c) Production of Non-Aqueous Polymer Dispersion

The resulting dispersion stabilizer solution was used by the following method to obtain a non-aqueous polymer dispersion.

Into the same four-necked flask as in Production Example 15(c) were charged 19.50 parts of the above dispersion stabilizer solution (b) and 1,233 parts of mineral spirit, which were warmed to 85° C. with stirring and added with a mixture having the following composition at this temperature and then held at 85° C. for 20 minutes:

| | |
|---|---|
| methyl methacrylate | 64.00 parts |
| methacrylic acid | 1.00 part |
| 2,2-azobisisobutyronitrile | 3.00 parts |

Then, 1.00 part of n-octylmercaptane was added, and thereafter two mixtures (I) and (II) having the following compositions were simultaneously added over 1.5 hours in case of the mixture (I) and over 3 hours in case of the mixture (II) at a temperature of 85° C. and further the temperature of 85° C. was held for 30 minutes to obtain an opaque white non-aqueous polymer dispersion having an involatile content of 555, a viscosity at 20° C. of 1.0 poise and an average particle size of 0.19 μm:

| | |
|---|---|
| Mixture (I) | |
| above dispersion stabilizer (b) | 124.50 parts |
| mineral spirit | 67.00 parts |
| Mixture (II) | |
| methyl methacrylate | 1,400.00 parts |
| methacrylic acid | 28.60 parts |
| 2,2-azobisisobutyronitrile | 3.00 parts |
| n-octylmercaptane | 2.20 parts |

The resulting dispersion was stable even after being left to stand at 20° C. for one month and exhibited no particle settlement, phase separation and viscosity change.

COMPARATIVE EXAMPLE 1

(a) Production of Vinyl Type Monomer

Into the same four-necked flask as in Production Example 15(a) was charged a mixture having the following composition, which was heated to 140° C. while raising temperature with stirring:

| | |
|---|---|
| benzoic acid | 122.0 parts |
| glycidyl methacrylate | 142.0 parts |
| hydroquinone | 0.3 part |
| xylene | 65.3 parts |
| N,N—dimethyl benzylamine | 0.4 part |

The stirring was continued at this temperature for 4 hours while introducing nitrogen gas thereinto and the reaction was stopped at an acid value of involatile matter of not more than 1 to obtain a vinyl type monomer solution having an involatile content of 80%.

(b) Production of Dispersion Stabilizer

Into the same four-necked flask as in Production Example 15(b) was charged 85.5 parts of xylene, which was heated to 95° C. while raising temperature with stirring. Then, a mixture having the following composition was added at a constant addition speed and a temperature of 95° C. over 2 hours and further held at 95° C. for 2 hours to obtain a dispersion stabilizer solution having an involatile content of 50%:

| | |
|---|---|
| above vinyl type monomer solution | 62.5 parts |
| butyl methacrylate | 50.0 parts |
| t-butylperoxy-2-ethyl hexanoate | 2.0 parts |

(c) Production of Non-Aqueous Polymer Dispersion

The same method as in Production Example 15(c) was repeated except that the dispersion stabilizer solution of Comparative Example 1(b) was used instead of the dispersion stabilizer solution of Production Example 15(b). In this case, the dispersion stability was insufficient because the chain length of the vinyl type monomer obtained in Comparative Example 1(a) was too short, and the particle agglomeration was caused in the course of the production of the non-aqueous polymer dispersion.

COMPARATIVE EXAMPLE 2

(a) Production of Vinyl Type Monomer Containing Polyester Chain Group

Into the same four-necked flask as in Production Example 15(a) was charged a mixture having the following compositon, which was heated to 140° C. while raising temperature with stirring. The stirring was continued at this temperature for 2 hours while introducing nitrogen gas thereinto to obtain a reaction intermediate solution having an acid value of involatile matter of 108 and a carboxyl group in terminal of molecule.

| | |
|---|---|
| benzoic acid | 122.0 parts |
| Kardula E10 | 250.0 parts |
| N,N—dimethyl benzylamine | 10.0 parts |
| phthalic anhydride | 148.0 parts |
| xylene | 1,215.0 parts |

The resulting reaction intermediate solution was reacted with a mixture of Kardula E10/phthalic anhydride=250.0 parts/148.0 parts under the same condition 11 times, and then the reaction was stopped at an acid value of final involatile matter of 11 to obtain a polyester compound solution having a carboxyl group in terminal of molecule and an involatile content of 80%. This polyester compound solution was stirred according to the following recipe at a temperature of 140° C. for 4 hours and the reaction was stopped at an acid value of involatile matter of not more than 1 to obtain a vinyl type monomer containing polyester chain group solution having an involatile content of 80%.

| | |
|---|---|
| above polyester compound solution | 6,123.0 parts |
| glycidyl methacrylate | 142.0 parts |
| hydroquinone | 2.0 parts |
| xylene | 35.0 parts |

(b) Production of Dispersion Stabilizer

Into the same four-necked flask as in Production Example 15(b) was charged 85.5 parts of xylene, which was heated to 95° C. while raising temperature with stirring. Then, a mixture having the following composition was added at a constant addition speed and a temperature of 95° C. over 2 hours and further held at 95° C. for 2 hours to obtain a dispersion stabilizer solution having an involatile content of 50%:

| | |
|---|---|
| above vinyl type monomer containing polyester chain group solution (a) | 62.5 parts |
| butyl methacrylate | 50.0 parts |
| t-butylperoxy-2-ethyl hexanoate | 2.0 parts |

(c) Production of Non-Aqueous Polymer Dispersion

The same procedure as in Production Example 15(c) was repeated except that the dispersion stabilizer solution of Comparative Example 2(b) was used instead of the dispersion stabilizer solution of Production Example 15(b). In this case, since the esterification reaction of vinyl type monomer containing polyester chain group was repeated more than 10 times to make the molecular weight distribution of the dispersion stabilizer wider, the dispersion stability of the resulting non-aqueous polymer dispersion lowered and the particle settlement was caused.

COMPARATIVE EXAMPLE 3

(a) Production of Dispersion Stabilizer

Into the same four-necked flask as in Production Example 15(b) was charged 95.5 parts of xylene, which was reacted with a mixture having the following composition by the same procedure as in Production Example 15(b) to obtain a dispersion stabilizer solution having an involatile content of 50%:

| | |
|---|---|
| vinyl type monomer containing polyester chain group solution of Production Example 15(a) | 12.5 parts |
| butyl methacrylate | 90.0 parts |
| t-butylperoxy-2-ethyl hexanoate | 2.0 parts |

(b) Production of Non-Aqueous Polymer Dispersion

The same procedure as in Production Example 15(c) was repeated except that the dispersion stabilizer solution of Comparative Example 3(a) was used instead of the dispersion stabilizer solution of Production Example 15(b). In this case, since the amount of vinyl type monomer containing polyester chain group was less than 20% by weight, the dispersion stability was insufficient and the particle agglomeration was caused in the course of the production of non-aqueous polymer dispersion.

COMPARATIVE EXAMPLE 4

(a) Production of Vinyl Type Monomer Containing Polyester Chain Group

Into the same four-necked flask as in Production Example 15(a) was charged a mixture having the following composition, which was heated to 140° C. while raising temperature with stirring. The stirring was continued at this temperature for 4 hours while introducing nitrogen gas thereinto and the reaction was stopped at an acid value of involatile matter of not more than 1 to obtain a vinyl type monomer containing polyester chain group solution having an involatile content of 80%.

| | |
|---|---|
| Kardula E10 | 750.0 parts |
| phthalic anhydride | 444.0 parts |
| 2-hydroxyethyl methacrylate | 130.0 parts |
| N,N—dimethyl benzylamine | 2.0 parts |
| hydroquinone | 1.6 parts |
| xylene | 327.4 parts |

(b) Production of Dispersion Stablilizer

Into the same four-necked flask as in Production Example 15(b) was charged 85.5 parts of xylene, which was heated to 95° C. while raising temperature with stirring. Then, a mixture having the following composition was added at a constant addition speed and a temperature of 95° C. over 2 hours and further held at 95° C. for 2 hours to obtain a dispersion stabilizer solution having an involatile content of 50%.

| | |
|---|---|
| above vinyl type monomer containing polyester group solution (a) | 62.5 parts |
| butyl methacrylate | 50.0 parts |
| t-butylperoxy-2-ethyl hexanoate | 2.0 parts |

(c) Production of Non-Aqueous Polymer Dispersion

The same procedure as in Production Example 15(c) was repeated except that the dispersion stabilizer solution of Comparative Example 4(b) was used instead of the dispersion stabilizer solution of Production Example 15(b). In the dispersion stabilizer (b), the hydroxyl group was not arranged in the vicinity of the main chain of the dispersion stabilizer but was arranged in the vicinity of terminal of polyester chain group at side chain, so that the side chain was apt to be entangled with the main chain and it was difficult to solvate the side chain of the dispersion stabilizer. As a result, the dispersion stability of the resulting non-aqueous polymer dispersion was insufficient and the particle settlement was caused in the course of the production of non-aqueous polymer dispersion.

EXAMPLE 1

| | | |
|---|---|---|
| aliphatic sulfonic acid compound solution of Production Example 1 | 4.0 | parts |
| non-aqueous polymer dispersion of Production Example 15(c) | 50.0 | parts |
| polyester resin solution (involatile content: 85%, XP-5770-85, made by Kargil Corp.) | 82.4 | parts |
| methylated melamine resin (involatile content: 100%, number-average molecular weight: 370, Cymel 303, trade name, made by Mitsui Cyanamid Co., Ltd.) | 30.0 | parts |
| rutile titanium dioxide (Teika Sanka Titan JR-602, trade name, made by Teikoku Kako Co., Ltd.) | 84.0 | parts |
| xylene | 18.0 | parts |
| n-butyl alcohol | 2.0 | parts |

The above ingredients other than the melamine resin were charged into a sand mill and dispersed to a particle size of not more than 10 μm for 30 minutes. Then, the melamine resin was added to produce a coating.

Thereafter, the coating was diluted to a given coating viscosity (Ford Cup No. 4, 20° C., 30 seconds) with a thinner (xylene/n-butyl alcohol=9/1 weight ratio). Then, this diluted coating was sprayed under air pressure to a test panel, wherein a phosphated soft steel panel was electrodeposited with a cathodic electrodeposition coating (Aqua No. 4200, trade name, made by Nippon Oil & Fats Co., Ltd.) at a dry thickness of 20 μm baked at 175° C. for 25 minutes, coated by spraying with a surfacer (Epiko No. 1500cp Sealer, trade name, made by Nippon Oil & Fats Co., Ltd.) at a dry thickness of 40 μm baked at 140° for 30 minutes, and then baked at 140° C. under a vertically stood state for 30 minutes. As a result, when the coated thickness reached up to 45 μm, the sagging was not caused and the bittiness and color change were not observed and consequently a smooth and glossy coated film (specular gloss at 60°:93) was obtained. Further, when a droplet (0.2 ml) of 1N sulfuric acid solution was spotly dropped on this film and left to stand at 20° C. for 4 hours, there was observed no change, and the acid resistance was excellent. Moreover, the film had an excellent water resistance because there was observed no change when the film was immersed in a warm water at 40° C. for 5 days.

EXAMPLES 2–11

A coating was prepared according to a compounding recipe as shown in the following Table 14 in the same manner as described in Example 1. When the resulting coating was applied in the same manner as in Example 1, a smooth and glossy coated film was obtained without observing the bittiness and color change. Further, when the coated film was subjected to acid test and water test in the same manner as in Example 1, the excellent acid resistance and water resistance were obtained. The compounding recipe and film performances are shown in the following Table 16.

TABLE 14

| | Example | | | | | | | | | |
|---|---|---|---|---|---|---|---|---|---|---|
| | 2 | 3 | 4 | 5 | 6 | 7 | 8 | 9 | 10 | 11 |
| Aliphatic sulfonic acid compound solution | | | | | | | | | | |
| Production Example 2 | 2.0 | | | | | | | | | |
| Production Example 3 | | 4.0 | | | | | | | | |
| Production Example 4 | | | 4.0 | | | | | | | |
| Production Example 5 | | | | 4.8 | | | | | | |
| Production Example 9 | | | | | 20.0 | | | | | |
| Production Example 10 | | | | | | 18.3 | | | | |
| Production Example 11 | | | | | | | 18.3 | | | |
| Production Example 6 | | | | | | | | 8.0 | | |
| Production Example 7 | | | | | | | | | 8.0 | |
| Production Example 8 | | | | | | | | | | 8.0 |
| Non-aqueous polymer dispersion | | | | | | | | | | |
| Production Example 16 | 90.0 | | | | | | | | | |
| Production Example 17 | | 20.0 | | | | | | | | |
| Production Example 19 | | | 163.6 | | | | | | | |
| Production Example 20 | | | | 175.0 | | | | | | |
| Production Example 21 | | | | | 20.0 | | | | | |
| Production Example 24 | | | | | | 50.0 | 50.0 | | | |
| Production Example 18 | | | | | | | | 25.0 | | |
| Production Example 22 | | | | | | | | | 25.0 | |
| Production Example 23 | | | | | | | | | | 25.0 |
| Polyol resin | | | | | | | | | | |
| A | 85.7 | | | | 57.1 | | | 85.7 | 85.7 | 85.7 |
| B | | 83.3 | | | | | | | | |
| C | | | 100.0 | | | 87.5 | 87.5 | | | |
| D | | | | | | 70.6 | | | | |
| Alkyletherified melamine resin | | | | | | | | | | |
| E | | 40.0 | | | | 40.0 | | | | |
| F | | | 50.0 | | | | | | | |

TABLE 14-continued

| | Example | | | | | | | | | |
|---|---|---|---|---|---|---|---|---|---|---|
| | 2 | 3 | 4 | 5 | 6 | 7 | 8 | 9 | 10 | 11 |
| G | | | 20.0 | | | | | 40.0 | 40.0 | 40.0 |
| H | | | | 60.0 | | | | | | |
| I | | | | | | 31.6 | | | | |
| J | | | | | | | 30.0 | | | |
| titanium dioxide | 105.0 | 73.5 | 133.0 | 119.0 | 77.0 | 84.0 | 84.0 | 77.0 | 77.0 | 77.0 |
| xylene | 25.0 | 18.0 | 32.0 | 32.0 | 18.0 | 20.0 | 20.0 | 18.0 | 18.0 | 18.0 |
| n-butyl alcohol | 3.0 | 2.0 | 3.0 | 3.0 | 2.0 | 2.5 | 2.5 | 2.0 | 2.0 | 2.0 |

Note
polyol resin
A: Acrydic A-413 70S (acrylic resin solution, trade name, made by Dainippon Ink & Chemicals, Inc., involatile content: 70%)
B: Aroplats 1713-R60 (silicon polyester resin solution, trade name, made by Nisshoku Aro Kagaku Co., Ltd., involatile content: 60%)
C: Joncryl 500 (acrylic resin solution, trade name, made by Johnson Wax Co., Ltd., involatile content: 80%)
D: Polyester XP-5770-85
alkyletherified melamine resin
E: Nikalac MW-30 (methylated melamine resin, trade name, made by Sanwa Chemicals Co., Ltd., involatile content: 100%, number-average molecular weight: 340)
F: Cymel 1130 (methyl-ethyl mixed etherified melamine resin, trade name, made by Mitsui Cyanamid Co., Ltd., Involatile content: 100%, number-average molecular weight: 460)
G: Cymel 303
H: Cymel 1116 (involatile content: 100%, number-average molecular weight: 420)
I: U-van 120 (butylated melamine resin solution, trade name, made by Mitsui Toatsu Co., Ltd., involatile content: 95%, number-average molecular weight: 920)
J: Resimene 755 (methyl-butyl mixed etherified melamine resin, trade name, made by Monsanto Co., involatile content: 100%, number-average molecular weight: 480)

COMPARATIVE EXAMPLES 5-10

A coating was prepared according to a compounding recipe shown in the following Table 15 in the same manner as in Example 1. The film properties were evaluated with respect to the coatings in the same manner as in Example 1 to obtain results as shown in Table 16 together with the compounding recipe.

TABLE 15

| | Comparative Example | | | | | |
|---|---|---|---|---|---|---|
| | 5 | 6 | 7 | 8 | 9 | 10 |
| Aliphatic sulfonic acid compound solution | | | | | | |
| Prorudction Example 12 | 4.0 | | | | | |
| Prorudction Example 13 | | 16.0 | | | | |
| Prorudction Example 14 | | | 6.7 | | | |
| Prorudction Example 5 | | | | 0.4 | | |
| Prorudction Example 1 | | | | | 50.0 | |
| Prorudction | | | | | | 18.3 |
| Example 11 Non-aqueous polymer dispersion | | | | | | |
| Prorudction Example 15 | 50.0 | 50.0 | | | 50.0 | |
| Prorudction Example 20 | | | | 175.0 | | |
| Prorudction Example 25 | | | | | | 36.4 |
| Polyol resin | | | | | | |
| A | | | | 57.1 | | |
| C | | | | | | 87.5 |
| D | 82.4 | 108.2 | 82.4 | | 29.4 | |
| Alkyletherified melamine resin | | | | | | |
| G | 30.0 | 8.0 | 30.0 | | 75.0 | |
| H | | | | 60.0 | | |
| J | | | | | | 30.0 |
| titanium dioxide | 84.0 | 84.0 | 70.0 | 119.0 | 84.0 | 84.0 |
| xylene | 18.0 | 18.0 | 18.0 | 32.0 | 20.0 | 18.0 |
| n-butyl alcohol | 2.0 | 2.0 | 2.0 | 3.0 | 2.5 | 2.0 |

TABLE 16

| | Example | | | | | |
|---|---|---|---|---|---|---|
| | 1 | 2 | 3 | 4 | 5 | 6 |
| Aliphatic sulfonic acid compound addition amount (a) | Procution Example 1 1.0 part | Procution Example 2 0.5 part | Procution Example 3 1.0 part | Procution Example 4 1.0 part | Procution Example 5 1.2 parts | Procution Example 9 6.0 parts |
| Non-aqueous polymer dispersion addition amount (b) | Procution Example 15 20.0 parts | Procution Example 16 50.0 parts | Procution Example 17 5.0 parts | Procution Example 19 90.0 parts | Procution Example 20 70.0 parts | Procution Example 21 10.0 parts |
| Polyol resin | Polyester XP-5770-85 70.0 parts | Acrydic A-413-70S 60.0 parts | Aroplats 1713-R60 50.0 parts | Joncryl 500 80.0 parts | Acrydic A-413-70S 40.0 parts | Polyester XP-5770-85 60.0 parts |
| Alkyletherified melamine resin | Cymel 303 30.0 parts | Nikalac MW30 40.0 parts | Cymel 1130 40.0 parts | Cymel 303 20.0 parts | Cymel 1116 60.0 parts | Nikalac MW30 40.0 parts |
| Film performances | | | | | | |
| bittiness (1) | good | good | good | good | good | good |
| color change (2) | good | good | good | good | good | good |
| glossiness at 60° | 93 | 92 | 93 | 91 | 92 | 92 |
| acid resistance (3) | good | good | good | good | good | good |
| water resistance (4) | good | good | good | good | good | good |
| sagging limit thickness (μm) (5) | 45 | 47 | 42 | 49 | 48 | 44 |

Example

TABLE 16-continued

|  | 7 | 8 | 9 | 10 | 11 |
|---|---|---|---|---|---|
| Aliphatic sulfonic acid compound addition amount (a) | Procution Example 10 5.5 parts | Procution Example 11 5.5 parts | Procution Example 6 2.0 parts | Procution Example 7 2.0 parts | Procution Example 8 2.0 parts |
| Non-aqueous polymer dispersion addition amount (b) | Procution Example 24 20.0 parts | Procution Example 24 20.0 parts | Procution Example 18 10.0 parts | Procution Example 22 10.0 parts | Procution Example 23 10.0 parts |
| Polyol resin | Joncryl 500 70.0 parts | Joncryl 500 70.0 parts | Acrydic A-413-70S 60.0 parts | Acrydic A-413-70S 60.0 parts | Acrydic A-413-70S 60.0 parts |
| Alkyletherified melanime resin | U-van 120 30.0 parts | Resimene 755 30.0 parts | Cymel 303 40.0 parts | Cymel 303 40.0 parts | Cymel 303 40.0 parts |
| Film performances |  |  |  |  |  |
| bittiness (1) | good | good | good | good | good |
| color change (2) | good | good | good | good | good |
| glossiness at 60° | 93 | 93 | 91 | 92 | 92 |
| acid resistance (3) | good | good | good | good | good |
| water resistance (4) | good | good | good | good | good |
| sagging limit thickness (μm) (5) | 46 | 45 | 44 | 46 | 45 |

|  | Comparative Example | | | | | |
|---|---|---|---|---|---|---|
|  | 5 | 6 | 7 | 8 | 9 | 10 |
| Aliphatic sulfonic acid compound addition amount (a) | Procution Example 12 1.0 part | Procution Example 13 4.0 parts | Procution Example 14 1.0 part | Procution Example 5 0.1 part | Procution Example 1 12.5 parts | Procution Example 11 5.5 parts |
| Non-aqueous polymer dispersion addition amount (b) | Procution Example 15 20.0 parts | Procution Example 15 20.0 parts | — | Procution Example 20 70.0 parts | Procution Example 15 20.0 parts | Procution Example 25 20.0 parts |
| Polyol resin | Polyester XP-5770-85 70.0 parts | Polyester XP-5770-85 92.0 parts | Polyester XP-5770-85 70.0 parts | Arydic A-413-70S 40.0 parts | Polyester XP-5770-85 25.0 parts | Joncryl 500 70.0 parts |
| Alkyletherified melamine resin | Cymel 303 30.0 parts | Cymel 303 8.0 parts | Cymel 303 30.0 parts | Cymel 1116 60.0 parts | Cymel 303 75.0 parts | Resimene 755 30.0 parts |
| Film performances |  |  |  |  |  |  |
| bittiness (1) | poor | good | poor | coated film was not cured | good | good |
| color change (2) | good | poor | good |  | good | good |
| glossiness at 60° | 92 | 93 | 91 |  | 92 | 35 |
| acid resistance (3) | good | good | good |  | poor | — |
| water resistance (4) | good | poor | good |  | poor | — |
| sagging limit thickness (μm) (5) | 44 | 44 | 30 |  | 46 | — |

Note:
(1) Judgement of bittiness
good: no observation
poor: more than 5/cm² was observed on the film surface.
(2) Judgement of color change
good: no observation
poor: considerably observed by visual test
(3) Judgement of acid resistance
good: no observation
poor: considerably observed by visual test
(4) Judgement of water resistance
good: blister of film surface was not observed.
poor: blister of more than 10/cm² was observed on the film surface.
(5) Evaluation of sagging limit thickness (μm)
The coating diluted to 30 seconds (20° C.) through Ford Cup No. 4 was applied by air spraying to the same test panel as in Example 1 at the vertically stood state and baked at 140° C. for 30 minutes. Then, the limit thickness observing no sagging was measured visually.
(a) amount of aliphatic or aromatic sulfonic acid in aliphatic or aromatic sulfonic acid compound based on 100 parts by weight of resin (parts by weight)
(b) amount of polymer solid content in non-aqueous polymer dispersion based on 100 parts by weight of resin (parts by weight)

TABLE 17

| Example | Aliphatic sulfonic acid | Blocking or esterification agent Kind | addition amount(a) |
|---|---|---|---|
| 1 | $C_{18}H_{37}SO_3H$ | pyridine | 1.0 |
| 2 | $C_{16}H_{33}CH\text{—}COOH$ <br> $\quad\quad\quad\quad\vert$ <br> $\quad\quad\quad\quad SO_3H$ | pyridine | 0.5 |
| 3 | $\quad\quad\quad O$ <br> $\quad\quad\quad\Vert$ <br> $C_{17}H_{35}OCCH_2SO_3H$ | pyridine | 1.0 |
| 4 | $C_{18}H_{37}OCH_2CH_2SO_3H$ | N,N—dimethyl benzylamine | 1.0 |
| 5 | $C_{18}H_{37}(OCH_2CH_2)_2SO_3H$ | N,N—dimethyl ethanolamine | 1.2 |
| 6 | $\quad\quad\quad\quad O$ <br> $\quad\quad\quad\quad\Vert$ <br> $C_8H_{17}OCCHSO_3H$ <br> $\quad\quad\quad\quad\vert$ <br> $C_8H_{17}OCCH_2$ <br> $\quad\quad\quad\Vert$ <br> $\quad\quad\quad O$ | Kardula E10 | 6.0 |
| 7 | $\quad\quad\quad\quad O$ <br> $\quad\quad\quad\quad\Vert$ <br> $CH(CH_2)_7COCH_2CH_2SO_3H$ <br> $\Vert$ <br> $CH(CH_2)_7CH_3$ | phenyl glycidylether | 5.5 |

TABLE 17-continued

| Ex-ample | Aliphatic sulfonic acid | Blocking or esterification agent Kind | addition amount(a) |
|---|---|---|---|
| 8 | $C_{17}H_{35}\overset{O}{\underset{\|}{C}}OCH_2CH_2SO_3H$ | Kardula E10 | 5.5 |
| 9 | $C_8H_{17}SO_3H$ | pyridine | 2.0 |
| 10 | $C_{12}H_{25}SO_3H$ | N,N—diemtyl benzylamine | 2.0 |

| Ex-ample | Aliphatic sulfonic acid | Blocking or esterification agent Kind | addition amount(a) |
|---|---|---|---|
| 11 | $C_{13}H_{27}\overset{O}{\underset{\|}{C}}OCH_2CH_2SO_3H$ | N,N—dimethyl ethanolamine | 2.0 |

(a) amount of aliphatic or aromatic sulfonic acid in aliphatic or aromatic sulfonic acid compound based on 100 parts by weight of resin (parts by weight)

TABLE 18

| | | Production Example | | | | |
|---|---|---|---|---|---|---|
| | | 15 | 16 | 17 | 18 | 19 |
| Components constituting vinyl type monomer containing polyester chain group | acid anhydride | phthalic anhydride 444 parts | phthalic anhydride 740 parts | succinic anhydride 944 parts | succinic anhydride 708 parts | hexahydro phthalic anhydride 462 parts |
| | monofunctional epoxy compound | Kardula E10 750 parts | Kardula E10 1250 parts | pheny glycidyl-ehter 1200 parts | pheny glycidyl-ehter 900 parts | AOE-X-24 410 parts |
| | monocarboxylic acid | benzoic acid 122 parts | propionic acid 74 parts | lauric acid 200 parts | stearic acid 284 parts | — |
| | monovalent alcohol | — | — | — | — | benzyl alcohol 108 parts |
| | vinyl tape monomer containing glycidyl group | glycidyl methacrylate 142 parts | glycidyl methacrylate 142 parts | glycidyl methacrylate 142 parts | glycidyl methacrylate 142 parts | glycidyl acrylate 130 parts |
| | repeated number of esterification reaction | 3 | 5 | 8 | 6 | 2 |

| | | Production Example | | | |
|---|---|---|---|---|---|
| | | 20 | 21 | 22 | 23 |
| Components constituting vinyl type monomer containing polyester chain group | acid anhydride | succinic anhydride 708 parts | succinic anhydride 1298 parts | phthalic anhydride 592 parts | phthalic anhydride 592 parts |
| | mono functional epoxy compound | p-t-butyl benzoic acid glycidyl-ester 1170 parts | styrene oxide 1200 parts | Kardula E10 1000 parts | Kardula E10 1000 parts |
| | monocarboxylic acid | — | — | — | — |
| | monovalent alcohol | cyclohexyl alcohol 100 parts | stearyl alcohol 270 parts | n-butyl alcohol 74 parts | lauryl alcohol 186 parts |
| | vinyl type monomer containing glycidyl group | glycidyl methacrylate 142 parts | glycidyl methacrylate 142 parts | glycidyl methacrylate 142 parts | glycidyl methacrylate 142 parts |
| | repeated number of esterification reaction | 5 | 10 | 4 | 4 |

| | | Production Example | | | | |
|---|---|---|---|---|---|---|
| | | 15 | 16 | 17 | 18 | 19 |
| Components constituting dispersion stabilizer | vinyl type monomer containing polyester chain group | 50 parts | 80 parts | 25 parts | 50 parts | 40 parts |
| | butyl methacrylate | 50 parts | — | — | 50 parts | — |
| | methyl methacrylate | — | 20 parts | — | — | 30 parts |
| | 2-ethyl hexyl methacrylate | — | — | 75 parts | — | — |
| | lauryl methacrylate | — | — | — | — | — |
| | butyl acrylate | — | — | — | — | 30 parts |
| involatile content (%) | | 40 | 55 | 25 | 40 | 55 |
| dispersion stabilizer/ particle (weight ratio) | | 30/70 | 45/55 | 30/70 | 30/70 | 20/80 |

TABLE 18-continued

|  |  |  |  |  |  |
|---|---|---|---|---|---|
| state | good | good | good | good | good |
| viscosity (20° C., poise) | 0.8 | 2.5 | 0.7 | 0.9 | 3.2 |
| average particle size (μm) | 0.18 | 0.16 | 0.17 | 0.18 | 0.19 |

|  |  | Production Example |  |  |  |
|---|---|---|---|---|---|
|  |  | 20 | 21 | 22 | 23 |
| Components constituting dispersion stabilizer | vinyl type monomer containing polyester chain group | 100 parts | 20 parts | 50 parts | 50 parts |
|  | butyl methacrylate | — | — | 50 parts | 50 parts |
|  | methyl methacrylate | — | 30 parts | — | — |
|  | 2-ethyl hexyl methacrylate | — | — | — | — |
|  | lauryl methacrylate | — | 50 parts | — | — |
|  | butyl acrylate | — | — | — | — |
| involatile content (%) |  | 40 | 50 | 40 | 40 |
| dispersion stabilizer/particle (weight ratio) |  | 35/65 | 70/30 | 30/70 | 30/70 |
| state |  | good | good | good | good |
| viscosity (20° C., poise) |  | 1.3 | 2.1 | 0.8 | 0.8 |
| average particle size (μm) |  | 0.18 | 0.15 | 0.17 | 0.18 |

|  |  | Production Example | Comparative Example |  |  |  |
|---|---|---|---|---|---|---|
|  |  | 24 | 1 | 2 | 3 | 4 |
| Components constituting vinyl type monomer containing polyester chain group | acid anhydride | hexahydro phthalic anhydride 154 parts | — | phthalic anhydride 1776 parts | phthalic anhydride 444 parts | phthalic anhydride 444 parts |
|  | monofunctional epoxy compound | Kardula E10 250 parts | — | Kardula E10 3000 parts | Kardula E10 750 parts | Kardula E10 750 parts |
|  | monovalent alcohol | — | — | — | — | — |
|  | monocarboxylic acid | p-t-butyl benzoic acid 178 parts | benzoic acid 122 parts | benzoic acid 122 parts | benzoic acid 122 parts | — |
|  | vinyl type monomer containing glycidyl group | glycidyl acrylate 130 parts | glycidyl methacrylate 142 parts | glycidyl methacrylate 142 parts | glycidyl methacrylate 142 parts | 2-hydroxyethyl methacrylate 130 parts |
|  | repeated number of esterification reaction | 1 | 0 | 12 | 3 | 3 |

|  |  | Production Example | Comparative Example |  |  |  |
|---|---|---|---|---|---|---|
|  |  | 24 | 1 | 2 | 3 | 4 |
| Components constituting dispersion stabilizer | vinyl type monomer containing polyester chain group | 60 parts | 50 parts | 50 parts | 10 parts | 50 parts |
|  | butyl methacrylate | 20 parts | 50 parts | 50 parts | 90 parts | 50 parts |
|  | methyl methacrylate | 20 parts | — | — | — | — |
|  | 2-ethyl hexyl methacrylate | — | — | — | — | — |
|  | lauryl methacrylate | — | — | — | — | — |
|  | butyl acrylate | — | — | — | — | — |
| involatile content (%) |  | 40 | 40 | 40 | 40 | 40 |
| dispersion stabilizer/particle (weight ratio) |  | 30/70 | 30/70 | 30/70 | 30/70 | 30/70 |
| state |  | good | particle agglomeration | particle settlement | particle agglomeration | particle agglomeration |
| viscosity (20° C., poise) |  | 1.0 | — | — | — | — |
| average particle size (μm) |  | 0.18 | — | — | — | — |

As shown in Table 16, in Examples 1~11, the aliphatic sulfonic acid compound having the structure shown in Table 17, the non-aqueous polymer dispersion having the composition shown in Table 18 and good state, the polyol resin and the alkyletherified melamine resin were used in proper amounts, so that the coated films having a thick sagging limit thickness and no bittiness and color change were obtained and also the acid resistance and water resistance were excellent.

On the other hand, in Comparative Examples 1~4, the non-aqueous polymer dispersion could not stably be produced from reasons as mentioned later, so that the desirable coating was not obtained. That is, in Comparative Example 1, the repeated number of esterification reaction in the vinyl type monomer containing polyester chain group as a component for dispersion stabilizer was less than 1, so that the dispersion stability of the non-aqueous polymer dispersion was insufficient and the particles were agglomerated. In Comparative Example 2, the repeated number of esterification reaction exceeded 10, so that the copolymerizability of the vinyl type monomer containing polyester chain group lowered and the molecular weight distribution of the dispersion stabilizer became wider and consequently the dispersion stability of the non-aqueous polymer dispersion was insufficient and the particles were settled. In Comparative Example 3, the amount of vinyl type monomer containing polyester chain group as a component for dispersion stabilizer was less than 20% by weight, so that the particles were agglomerated. In Comparative Example 4, the polyester chain group in the dispersion stabilizer was not arranged near to the main chain but arranged near the terminal of polyester chain group as a side chain, so that the side chain was apt to be entangled with the main chain and the side chain of the dispersion stabilizer was hardly solvated and consequently the dispersion stability of the non-aqueous polymer dispersion was insufficient and the particles were agglomerated.

In Comparative Example 5, the aromatic sulfonic acid compound blocked with pyridine was used instead of aliphatic sulfonic acid compound as an acid catalyst, so that the aromatic sulfonic acid compound precipitated through crystallization in the coating and consequently a large amount of bittiness occurred in the coated film. In Comparative Example 6, since a large amount of the aromatic sulfonic acid compound esterified with the epoxy compound was used instead of the aliphatic sulfonic acid compound, the coated film considerably changed into yellow in the heating and drying. Further, since the resin mixture consisted of more than 90 parts of polyol resin and less than 10 parts of alkyl-etherified melamine resin as solid content, a large amount of blister produced in the coated film after the water resistance test. In Comparative Example 7, the compound of lower aliphatic sulfonic acid having a carbon number of less than 4 blocked with pyridine was used, so that the lower aliphatic sulfonic acid compound precipitated through crystallization in the coating and consequently a large amount of bittiness was observed on the coated surface. Further, the non-aqueous polymer dispersion was not included in the coating, so that the sagging limit thickness was only 30 μm.

In Comparative Example 8, since the amount of aliphatic sulfonic acid compound was less than 0.2 part by weight as an aliphatic sulfonic acid based on 100 parts by weight as solid content of the resin mixture, the cured film could not be formed. In Comparative Example 9, since the amount of aliphatic sulfonic acid compound exceeded 10 parts by weight as an aliphatic sulfonic acid, a large amount of blister occurred in the film surface in the same water resistance test as in Example 1. Further, the amount of polyol resin was less than 30 parts and the amount of alkyletherified melamine resin was more than 70 parts in the solid resin mixture, so that the acid resistance of the coated film lowered.

In Comparative Example 10, the non-aqueous polymer dispersion disclosed in Japanese Patent Application Publication No. 43-16,147 and Japanese Patent laid open No. 54-150,439 was used and the vinyl type monomer containing 5 mol condensate of 12-hydroxystearic acid with a considerably low polarity was used instead of the proper polarity vinyl type monomer containing polyester chain group as a component for dispersion stabilizer, so that the compatibility between the non-aqueous polymer dispersion and the acrylic resin became poor and the agglomeration was caused to provide the ununiform and delustered coated film.

What is claimed is:

1. A higher solid coating composition, comprising 100 parts by weight of a solid resin mixture comprising 30 to 90 parts by weight of a polyol resin and 10 to 70 parts by weight of an alkyletherified melamine resin, 0.2 to 10 parts by weight as an aliphatic sulfonic acid of an aliphatic sulfonic acid compound having a carbon number of 4 to 22, and 1 to 100 parts by weight as a polymer solid content of a non-aqueous polymer dispersion, said non-aqueous polymer dispersion consisting essentially of (a) 40 to 80% by weight of an organic solvent component, (b) 10 to 50% by weight of particle component insoluble in said component (a), and (c) 5 to 40% by weight of a dispersion stabilizer component soluble in said component (a) and capabale of stably dispersing said component (b) into said component (a), said dispersion stabilizer component comprising a product obtained by polymerizing 20 to 100% by weight of a vinyl type monomer containing a polyester chain group represented by the following formula with 0 to 80% by weight of a second vinyl type monomer:

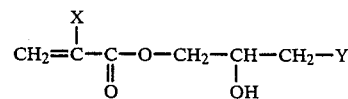

wherein X is a hydrogen atom or a methyl group, Y is

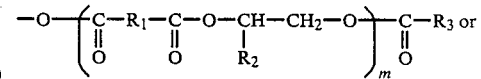

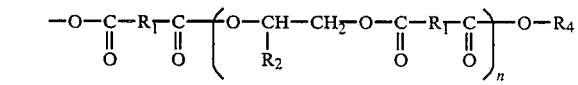

m and n are from 1 to 10, $R_1$ is a residue of acid anhydride having a carbon number of 2 to 6, $R_2$ is a phenyl group, an alkyl or aromatic group having a carbon number of 5 to 19,

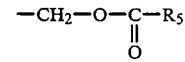

group ($R_5$ is an alkyl or aromatic group having a carbon number of 3 to 17, or —$CH_2$—O—$R_6$ group ($R_6$ is an alkyl or aromatic group having a carbon number of 4 to 18, $R_3$ is an alkyl group or a residue of aromatic monocarboxylic acid having a carbon number of 1 to 20, and $R_4$ is a residue of saturated aliphatic, alicyclic or aromatic monovalent alcohol having a carbon number of 1 to 18.

2. The higher solid coating composition according to claim 1, wherein said polyol resin is selected from the group consisting of alkyd resin, polyester resin, acrylic resin, epoxy resin, polyurethane resin, fluorine resin and silicone resin.

3. The higher solid coating composition according to claim 1, wherein said alkyletherified melamine resin has an alkyl group having a carbon number of not more than 8 and an average molecular weight of not more than 1,000.

4. The higher solid coating composition according to claim 1, wherein said aliphatic sulfonic acid compound is a tertiary amine salt of aliphatic sulfonic acid or an ester of aliphatic sulfonic acid with an epoxy compound.

* * * * *